No. 712,918. Patented Nov. 4, 1902.
W. D. EVANS & J. C. WIGGINS.
NUT LOCK.
(Application filed Mar. 31, 1902.)
(No Model.)

WITNESSES:
C. F. Wilcox

INVENTORS
William D. Evans
Josiah C. Wiggins
BY
ATTORNEYS.

UNITED STATES PATENT OFFICE.

WILLIAM D. EVANS AND JOSIAH C. WIGGINS, OF EUPORA, MISSISSIPPI.

NUT-LOCK.

SPECIFICATION forming part of Letters Patent No. 712,918, dated November 4, 1902.

Application filed March 31, 1902. Serial No. 100,772. (No model.)

*To all whom it may concern:*

Be it known that we, WILLIAM D. EVANS and JOSIAH C. WIGGINS, citizens of the United States, and residents of Eupora, in the county of Webster and State of Mississippi, have invented a new and Improved Nut-Lock, of which the following is a full, clear, and exact description.

The purpose of the invention is to provide a simple and positive nut-lock which will not detract from the strength or appearance of the bolt and nut, but will rather add thereto; and a further purpose of the invention is to construct a nut-lock which may be used with equally good results upon metal or upon wood, which may be universally used and expeditiously and conveniently applied, and which also when once adjusted cannot be shaken loose.

Another purpose of the invention is to construct the nut-lock in such manner that it may be so set that the nut can be forced by a wrench, if desired, or so that the lock can be loosened only by the use of a chisel or similar pointed tool.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
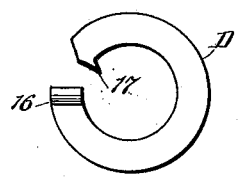
Figure 2:
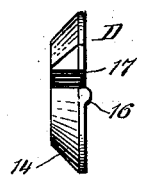
Figure 3:
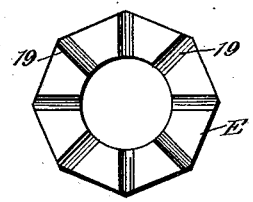
Figure 4:
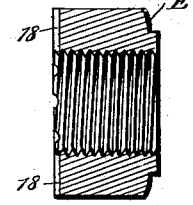
Figure 6:
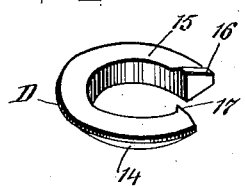
Figure 5:
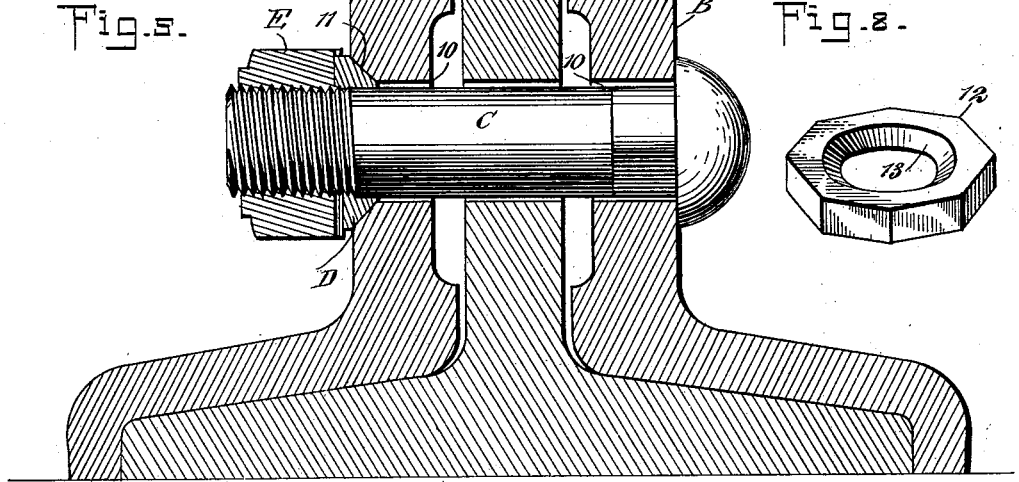
Figure 7:
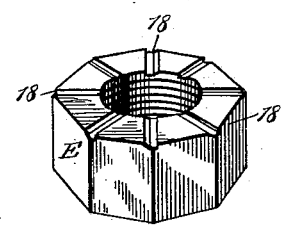
Figure 8:
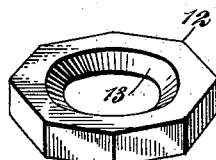

Figure 1 is a plan view of what we call a "spring chuck-washer" used in the construction of the nut-lock. Fig. 2 is an edge view of the washer shown in Fig. 1. Fig. 3 is an inner face view of the nut used in connection with the washer shown in Figs. 1 and 2. Fig. 4 is a section through the nut. Fig. 5 is a transverse section through a railway-rail and fish-plates and a sectional side elevation of the nut-lock employed. Fig. 6 is a perspective view of a slightly-modified form of chuck-washer. Fig. 7 is a perspective view of the nut used in connection with the washer shown in Fig. 6, and Fig. 8 is a perspective view of the countersunk washer which is used in connection with the nut-lock when it is applied to objects of wood.

A represents a railway-rail, and B the fish-plates, which fish-plates and the web of the rail are provided with the usual openings 10 for the passage of an ordinary bolt C. Where the threaded end of the bolt passes through the fish-plate or other article of metal a countersink 11 is made at the outer end of the opening; but if the bolt be passed through wood or other soft material a washer 12 is employed, (shown in Fig. 8 and having a central countersink 13,) which washer 12 is passed over the threaded end of the bolt to an engagement with the object through which the bolt extends.

What we term a "chuck-washer" D, (shown in Figs. 1, 2, 5, and 6,) constitutes a very important factor in the construction of the nut-lock. This washer is made of spring-steel of suitable thickness and is transversely cut or split, so that a space of predetermined width occurs between its ends. The outer side surface 14 of the washer is inclined from its free edge in direction of the inner surface of the washer, so that exteriorly the washer represents the frustum of a cone; but the inner surface 15 of the washer is circular and transversely straight, so that the chuck-washer may be readily slid over the threaded end of the bolt C. The chuck-washer D is of such size and the bevel of its outer side 14 is such that the washer D will fit in the countersink 11 or in the countersink 13 of the bearing-washer 12.

The front surface of the chuck-washer D is flat or rounded, and at one end of the washer a transverse rib 16 is produced upon its front face, which rib may be more or less sharp or rounded, as shown in Figs. 1 and 2, or flat, as is illustrated in Fig. 6, while at the opposite end of the washer a sharp inwardly-projecting spur 17 is made, which extends beyond the inner face of the washer, the inner diameter of the washer being such as to admit of it readily slipping over the bolt with the spur 17 near to or practically in engagement with the bolt. After the tapering surface of the chuck-washer D is seated in the countersink prepared to receive it and the nut E is screwed home on the bolt C, thus forcing the washer inward, the washer will be subjected to a choke grip, and its ends will be crowded in direction of each other, forcing the spur 17 into the thread of the bolt C, tightly locking the washer to the bolt and effectively preventing the latter from turning. The nut E is also locked in its adjusted position and is prevented from turning by reason of the rib 16 of the chuck-washer D entering one of a series of grooves 18 in the inner or contact face of the nut, as is shown in Figs. 3, 4, 5, and 7, which grooves radiate from the bore of the nut and extend to its outer side faces.

It will be understood that the cross-sectional shape of the grooves 18 will correspond to the cross-sectional shape of the rib on the washer D. When the rib on the washer D is rounded, as is shown in Figs. 1 and 2, the grooves in the nut are substantially U-shaped in cross-section, and when the rib has entered one of the grooves, the nut being tightened, it is possible for the nut to be unscrewed with a monkey-wrench or suitable tool; but when the rib on the washer D is rectangular in cross-section and the grooves in the nut have the same cross-sectional shape, as is shown in Figs. 6 and 7, when the nut is screwed home and the rib on the chuck-washer enters a groove in the nut it will be impossible to remove the nut through the medium of a wrench; but the nut may possibly be removed by the use of a cold-chisel suitably applied.

It will be observed that the nut-lock described and shown is exceedingly simple and is effective and that it may be applied wherever a lock for a nut is needed.

Having thus described our invention, we claim as new and desire to secure by Letters Patent—

1. In a nut-lock, a transversely-split nut-washer of spring material, having a beveled outer side surface and provided at one end upon its front surface with a transverse rib, the said washer having also an inwardly-bent terminal lug at its opposite end, which lug is sharp and extends beyond the inner surface of the washer, as described.

2. The combination with a countersunk seat, a bolt adapted to be passed through the said seat, a split spring-washer for the bolt, having its outer side surface beveled to fit the said countersunk seat and provided at one end upon its front surface with an inwardly-bent terminal lug, which lug is sharp and extends beyond the inner surface of the washer, and a nut for the bolt, having grooves in its inner or contact face to receive the rib on the washer, for the purpose described.

3. In a nut-lock, the combination with a beveled seat and a nut having grooves in its inner face, of a split spring-washer having its outer side surface beveled, being provided at one end upon its front face with a transverse rib adapted to enter a recess in the nut, the transverse rib being of the same cross-sectional shape as the cross-sectional shape of the groove in the nut, the opposite end of the said washer being provided with an inwardly-bent lug extending beyond the inner surface of the washer, all combined for the purposes specified.

In testimony whereof we have signed our names to this specification in the presence of two subscribing witnesses.

WILLIAM D. EVANS.
JOSIAH C. WIGGINS.

Witnesses:
LEE WILSON,
JNO. T. MARSHALL.